G. L. TINKHAM.
PNEUMATIC CUSHIONED FRAME SUSPENSION.
APPLICATION FILED SEPT. 7, 1912.

1,133,337.

Patented Mar. 30, 1915.

2 SHEETS—SHEET 1.

Witnesses:

Guy L. Tinkham, Inventor

By his Attorneys,
Edwards, Sager & Wooster.

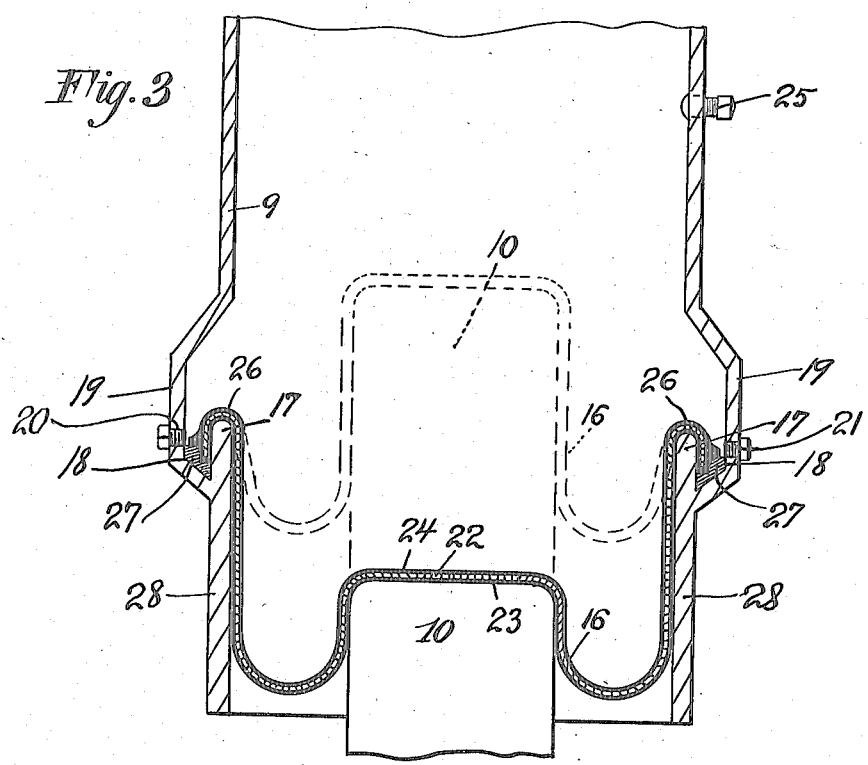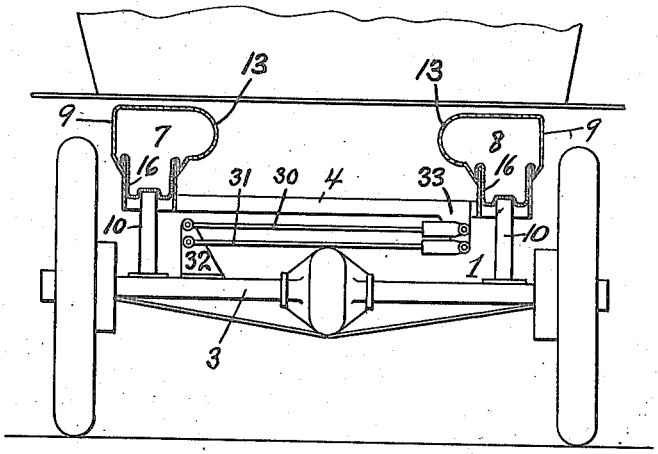

UNITED STATES PATENT OFFICE.

GUY L. TINKHAM, OF PARIS, FRANCE, ASSIGNOR TO TINKHAM SUSPENSION COMPANY, A CORPORATION OF ILLINOIS.

PNEUMATIC-CUSHIONED FRAME SUSPENSION.

1,133,337.

Specification of Letters Patent.

Patented Mar. 30, 1915.

Application filed September 7, 1912. Serial No. 719,215.

*To all whom it may concern:*

Be it known that I, GUY L. TINKHAM, a citizen of the United States of America, residing at Paris, France, have invented certain new and useful Improvements in Pneumatic-Cushioned Frame Suspensions, of which the following is a full, clear, and exact specification.

This invention relates to pneumatically cushioned frame suspensions for vehicles, railway cars, or the like, and is particularly directed to the construction of the pneumatic cushion, and the arrangement of suitable means for maintaining the cylinder and coöperating plunger in proper relation.

More specifically my invention is directed to suspensions for vehicles, cars, or the like, wherein the body or chassis is carried by the axles or wheel truck through the interposition of one or more pneumatic cushions.

Each pneumatic cushion consists of a cylinder, plunger and flexible diaphragm, and one particular object of this invention is to provide an effectual seal against leakage of air. This object is attained by providing within the cylinder adjacent the edge of the diaphragm, a trough, reservoir, ring or the like which will contain oil, grease or other fluid impervious to air. Thereby, what would otherwise be a leaking joint between the edge of the diaphragm and the top of the cylinder is avoided in a very simple and inexpensive manner.

In accordance with another object of the invention, free and unrestrained vertical movement of the axles or wheel truck in response to road inequalities is permitted, and at the same time undue swaying or tipping of the body is prevented. By my invention the diaphragm is automatically held in position with respect to the supporting cylinder and leakage of air is precluded by the seal effected by oil, grease, or other fluid or semi-fluid sealing substance, thereby overcoming the many serious objections heretofore met with in prior attempts to prevent leakage of air by mechanical joints.

Other features of my invention will be more fully understood from the following description and accompanying drawings, in which—

Figure 1:
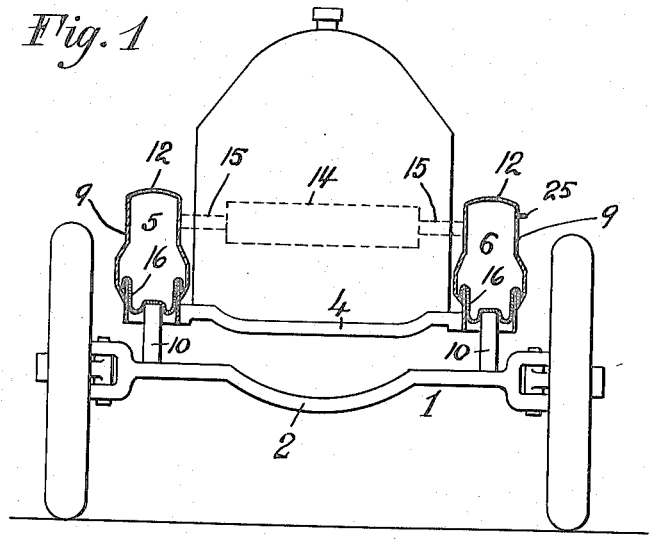
Figure 2:
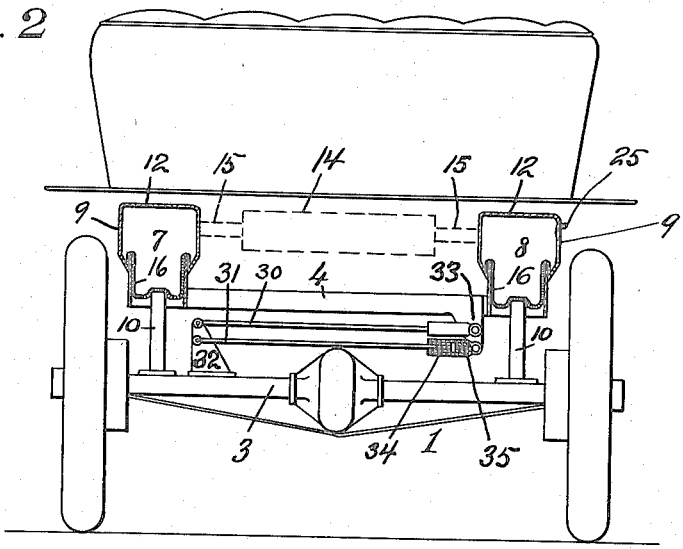

Figure 1 is a front elevation of an automobile having a pneumatically cushioned frame suspension constructed in accordance with my invention; Fig. 2 is a rear elevation of Fig. 1; Fig. 3 is a detail vertical section on an enlarged scale of the pneumatic cushion and associated parts indicated in Figs. 1 and 2. Fig. 4 is a rear elevation of a modified arrangement.

Referring to Figs. 1 and 2, the automobile wheel frame 1, comprising the front axle 2 and rear axle 3, supports the vehicle body or chassis 4 in whole or in part by means of the pneumatic cushions 5, 6, 7, 8.

In the drawings two pairs of pneumatic cushions are illustrated, one pair being disposed at a forward portion of the vehicle, and the other pair at the rear; however, the number of the cushions and locations of the same with respect to the chassis and wheel frame may be varied according to the character of the vehicle and the purposes of the designer. As shown more clearly in Fig. 3, each pneumatic cushion comprises a rigid supporting cylinder 9, a plunger 10, and a yieldable diaphragm and coöperating seal including a sealing fluid, set forth in detail hereinafter. Each supporting cylinder 9 is fixed in relation to the chassis, and each plunger 10 is rigidly carried by the wheel frame or truck. In Fig. 1, the plunger 10 of the forward air cushions 5, 6 are shown clamped to the front axle 2, and in Fig. 2 the plungers 10 of the rear cushions 7, 8 are illustrated clamped to the rear axle casing 3. The supporting cylinder 9, shown in Fig. 3, may be completed by a head 12 integral therewith, as shown in Figs. 1 and 2. Under certain circumstances, it is advantageous to connect the forward air cushions 5, 6 by air passages 15 leading to a common air tank 14 as shown in Fig. 1, and similarly provide a common air tank 14 with communicating passages 15 for the rear cushions 7, 8. It will also be clear that all of the cylinders of the pneumatic cushions may be connected by air passages to a single air tank. Under special conditions, the air tank and connecting passage may be omitted, and each cylinder may be provided with an extended portion to contain a sufficient amount of air to provide for the desired cushioning effect, as indicated in Fig. 4.

Normally, the plunger 10 is centrally related with respect to the opening of the cylinder 9 of the air cushion, and the area of the plunger 10 is appreciably less than the area of opening of the cylinder 9, as indicated in Fig. 3. The diaphragm 16 of suitable yieldable material is of a general circular shape having its outer edge turned over to engage the circular seat 17 of the seal. On the outer side of the seat 17 is provided an annular cup 18 formed in the enlarged portion 19 of the body 9 of the air cushion. The sealing oil or grease is charged into the annular cup 18 through the filling opening 20, and an overflow opening 21 for the sealing fluid may be provided. The diaphragm 16 may be formed of an inner portion 22 of leather, or like material with an outer layer of rubber 23 to guard against the entrance of moisture and an inside layer 24 of rubber to prevent leakage of air through the pores of the leather 22, as indicated in Fig. 3; however, other material or combination of materials of suitable characteristics for obtaining the desired results may be used. The diaphragm 16 is positioned by deforming or squeezing the upper portion thereof, pushing the same into the mouth of the support 9, whereupon the outer edge portion of the diaphragm will lap over the seat 17 and extend into the seal cup 18. Oil, or grease, or other sealing fluid is now pumped through the opening 20 into the annular cup 18 to a depth to sufficiently submerge the flared-edge portion of the diaphragm, or the oil may be pumped into the annular cup 18 before the diaphragm is inserted. The desired level of the sealing fluid may be determined by a suitable overflow or indication tube. The charging opening 20 and overflow 21 are now closed by suitable caps. Air under pressure is now pumped into the cushion through the non-return valve 25 whereupon the portion 26 of the diaphragm 16 engages more firmly the seat 17, and the leakage of air is effectually precluded by the oil or other sealing liquid 27. It will be understood that the cushions will be charged with air until the pressure is sufficient to lift and support the body of the vehicle or car in a normal mean position. The arrangement of connecting the forward cushions to a common air tank and the rear cushions to a separate common air tank is particularly advantageous for automobiles or other cars carrying unequally distributed loads, whereby the air tanks may be charged with different pressures according to the respective loads carried by the cushions connected thereto. It will also be clear in such cases where the air tank is omitted, the respective air cylinders may be charged with different pressures according to the proportional weights of the load carried by the same. It will be seen that when any wheel or wheels of the vehicle or car strike an obstacle, or under conditions of change in grade or inclination of the roadway, the plungers of the air cushions will move upwardly or downwardly, as the case may be, with a corresponding movement of the respective diaphragms in engagement with the plungers, the air in the cushions accommodating itself to the movements of the respective diaphragms, such movement of each plunger and diaphragm in relation to the cylinder of the air cushion taking place without any appreciable frictional or mechanical interference. The positions of the diaphragm and plunger shown in full lines in Fig. 3 are approximately normal mean positions, whereas the positions of these parts indicated in dotted lines are the highest positions. It will be noted that the diaphragm 16 is not only sealed against leakage of air by the sealing fluid 27 and at the seat 17, but the side portions of the diaphragm are held by the air pressure in close contact with the depending apron 28 of the supporting cylinder 9. Whatever tendency the sealing oil due to the air pressure may have to rise between the downward flare of the diaphragm and the wall of the seat 17, the pull of the side portions of the diaphragm engaging the apron 28 will prevent the sealing oil from passing the seat 17. To facilitate the insertion of the diaphragm, the circular apron 28 may be made of hinged or movable parts adapted to be clamped or otherwise fastened after the diaphragm has been adjusted. A bumper or stop may be provided to limit the upward movement of the plunger. It will thus be clear that free and unrestricted vertical movement of the plunger with respect to the supporting cylinder is permitted without reaction to the body of the vehicle or car; however, when the vehicle or car is rounding a corner, or the load is suddenly shifted, there is a tendency of the body to tip relatively to the axle or wheel frame on account of the sensitiveness of the air supports. This tipping or tilting tendency together with side swaying is restrained by improved strutting means arranged transversely to the frame of the vehicle. In Fig. 2, parallel struts 30, 31 are pivoted at one end to a standard 32 clamped to the axle. The struts 30, 31 are connected at the other end to the bracket 33 on the frame, there being springs 34, 35 at each side of the connection between the rods and the bracket, so as to offer a resistance to lateral movement and tilting of the body in either direction, while not interfering with or opposing tilting of the axle relatively to the body. Such arrangement allows the axle to move freely upwardly with respect to the chassis, while the chassis is restrained from tipping or tilting with reference to the axle by the resistance of the spring buffers 34, 35 to distortion. At the same time, the axle is allowed to momentarily tilt by reason of the parallel motion while a wheel is passing over an obstruction, and in case of a prolonged lateral incline, to gradually bring the body and axle parallel.

While shown in the drawings in connection with the rear axle, it will be understood that the same arrangement may be applied to the front axle within the scope of the invention. By this form of construction, it is possible to use relatively small springs, and to provide a compact and well appearing accessible construction, which will not be subject to damage from road obstructions, all parts being above the axle.

From the foregoing, it will be seen that I have provided a complete pneumatic suspension for vehicles, which will absorb road shocks without friction or jolts to the body of the vehicle, and at the same time prevent undue swaying or tipping of the body without restraining the normal movements of the axle. It will also be seen that my arrangement is simple in construction, and contains a minimum number of wearable parts, the latter being constructed and arranged to permit ready replacement.

Although I have illustrated my invention by certain specific forms thereof, it will be understood that many changes and modifications may be made without departing from the basic principles thereof.

Having thus described my invention, what I claim as new and desire to secure by Letters Patent of the United States is:—

1. A pneumatic device for vehicle frame suspensions, comprising an air reservoir adapted to be carried on the vehicle frame, a plunger movable within said reservoir and adapted to be connected to an axle of the vehicle, a diaphragm between said plunger and said reservoir, and means for retaining a fluid adjacent the edge of said diaphragm and said reservoir for effecting a gas seal.

2. A pneumatic device for vehicle frame suspensions comprising a cylindrical base adapted to contain air under pressure, said base having a seat, said base further having a cup-shaped part adjacent said seat adapted to hold a sealing fluid, and a diaphragm in engagement with said seat and having its periphery extending into said cup-shaped part.

3. In a pneumatic device for vehicle frame suspensions, a hollow base adapted to contain gas under pressure, said base having a sealing seat and a trough-shaped portion proximate said seat.

4. In a pneumatic device for vehicle frame suspensions, a cylindrical base having a bulged portion forming an annular trough for holding a sealing fluid, and a vertically extending portion adjacent said trough adapted to serve as a sealing seat.

5. A pneumatic device for vehicle frame suspensions, comprising in combination a reservoir adapted to contain gas under pressure, means for securing said reservoir in fixed relation to the body of the vehicle, a diaphragm, means including a sealing fluid for effecting a gas-tight connection between said reservoir and said diaphragm, a plunger engaging said diaphragm, and means for supporting said plunger in fixed relation to the wheel frame of the said vehicle.

6. In a vehicle, the combination with a frame and an axle thereof, of a flexible pneumatic air supporting cushion connected between the axle and the frame comprising a base having a liquid seal, a diaphragm extending into said seal and a plunger coöperating with said diaphragm, means for maintaining said base and said plunger in operative relation, said means comprising laterally separated oppositely projecting brackets connected respectively to the frame and to the axle, parallel rods connecting said brackets and including yielding connections to opposite tilting and swaying of the body relatively to the axle.

In testimony whereof I affix my signature, in presence of two witnesses.

GUY L. TINKHAM.

Witnesses:
HENRY J. LUCKE,
GEO. N. KERR.